(12) United States Patent  
Rollins et al.

(10) Patent No.: US 8,366,809 B2
(45) Date of Patent: Feb. 5, 2013

(54) DEAERATING METHOD AND ASSEMBLY

(75) Inventors: Michael J. Rollins, Chula Vista, CA (US); Melissa A. Bell, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 129 days.

(21) Appl. No.: 13/099,320

(22) Filed: May 2, 2011

(65) Prior Publication Data

US 2012/0234174 A1    Sep. 20, 2012

Related U.S. Application Data

(60) Provisional application No. 61/452,294, filed on Mar. 14, 2011.

(51) Int. Cl.
*B01D 19/00* (2006.01)

(52) U.S. Cl. .............. 95/261; 96/212; 96/187; 184/6.23

(58) Field of Classification Search .................... 96/212, 96/209, 210, 211, 187; 95/261; 184/6.23
See application file for complete search history.

(56) References Cited

U.S. PATENT DOCUMENTS

| 2,385,522 | A | * | 9/1945 | Malott ........................ 184/6.23 |
|---|---|---|---|---|
| 2,478,426 | A | | 8/1949 | Satre |
| 2,572,527 | A | | 10/1951 | Sebald |
| 2,725,956 | A | | 12/1955 | Cunningham |
| 3,768,726 | A | | 10/1973 | Hale et al. |
| 4,600,413 | A | | 7/1986 | Sugden |
| 4,715,869 | A | | 12/1987 | Ramshaw |
| 4,755,197 | A | | 7/1988 | Benson et al. |
| 4,793,440 | A | | 12/1988 | Iseman |
| 4,947,963 | A | | 8/1990 | Aho, Jr. |
| 4,962,829 | A | | 10/1990 | Sugden |
| 5,510,019 | A | * | 4/1996 | Yabumoto et al. ............ 210/137 |
| 5,587,068 | A | | 12/1996 | Aho, Jr. et al. |
| 6,348,087 | B1 | | 2/2002 | Aslin |
| 7,013,905 | B2 | | 3/2006 | Jones et al. |
| 2007/0163442 | A1 | * | 7/2007 | Saito et al. ...................... 96/209 |
| 2008/0098893 | A1 | * | 5/2008 | Ringenberger et al. ......... 95/261 |

* cited by examiner

*Primary Examiner* — Duane Smith
*Assistant Examiner* — Douglas Theisen
(74) *Attorney, Agent, or Firm* — Carlson, Gaskey & Olds PC

(57) ABSTRACT

An example deaerator assembly includes a deaerating member disposed within a housing. The deaerating member includes an apertured stem extending from a pedestal. The apertured stem is configured to communicate air away from a mixture of air and coolant when the mixture of air and coolant is communicated about the apertured stem.

16 Claims, 4 Drawing Sheets

US 8,366,809 B2

DEAERATING METHOD AND ASSEMBLY

CROSS-REFERENCE TO RELATED APPLICATIONS

This disclosure claims priority to U.S. Provisional Application No. 61/452,294, which was filed on 14 Mar. 2011 and is incorporated herein by reference.

STATEMENT REGARDING GOVERNMENT INTEREST

This invention was made with government support under Contract No. N0019-06-C-0081, and Subcontract No. 4500019224, awarded by the United States Navy. The Government may have certain rights in this invention.

BACKGROUND

This disclosure relates generally to a deaerator and, more particularly, to a deaerator having an apertured stem that facilitates separating air from a coolant.

Generators provide electric power as is known. Aircraft auxiliary power units, for example, typically include a generator that is driven by a turbine engine. The turbine engine is rotatably coupled to the generator through a gearbox. Coolant, such as oil, is circulated through the gearbox and the generator. The coolant removes thermal energy and lubricates various components. Coolant mixes with air as the coolant circulates through the generator. As known, at least some of the air must be separated from the coolant before the coolant can be reintroduced to the gearbox and the generator. Deaerators are used to separate air from the coolant. The coolant is collected within a sump after the deaerator removes the air. The coolant is recirculated through the gearbox and the generator from the sump.

SUMMARY

An example deaerator assembly includes a deaerating member disposed within a housing. The deaerating member includes an apertured stem extending from a pedestal. The apertured stem is configured to communicate air away from a mixture of air and coolant when the mixture of air and coolant is communicated about the apertured stem.

An example aircraft auxiliary power unit assembly includes a gearbox configured to rotatably couple a turbomachine to a generator and a coolant path configured to communicate a coolant through the gearbox and the generator. A deaerator assembly of the assembly has a deaerating member that includes an apertured stem extending from a pedestal. A mixture of air and the coolant is communicated about the apertured stem to separate air from the coolant.

An example method of removing air from a mixture of air and coolant includes spiraling a mixture of air and coolant about an apertured stem in a deaerator assembly. The method communicates some of the air from the mixture through an array of apertures in the apertured stem to a bore in the apertured stem. The method vents the air from the bore.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
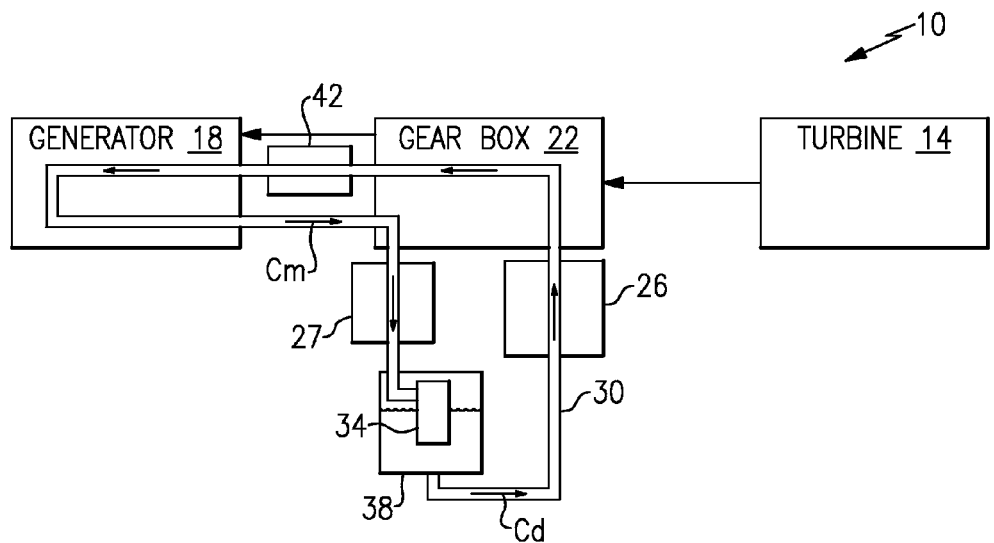
FIG. 1 shows a highly schematic view of an example auxiliary power unit and associated coolant path.
Figure 7:
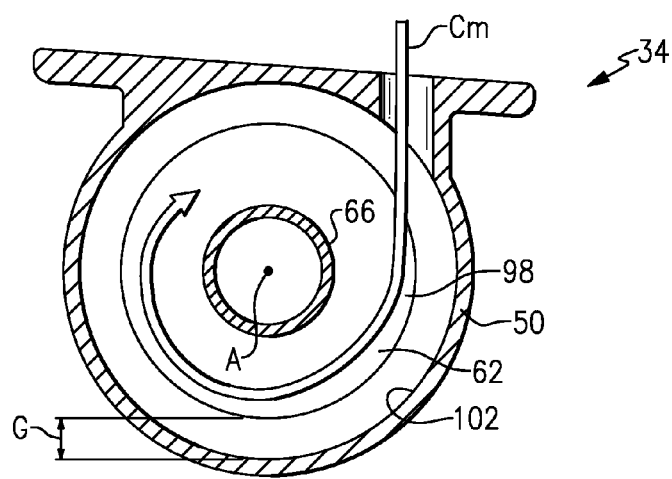
FIG. 7 shows a section view at line 7-7 of FIG. 3.

Referring to FIG. 1, an example auxiliary power unit arrangement 10 includes a turbomachine, turbine engine 14, rotatably coupled to a generator 18 through a gearbox 22. A pump 26 circulates a coolant, such as an oil, along a coolant path 30. The coolant cools and lubricates portions of the generator 18 and the gearbox 22.

The coolant mixes with air as when circulating through the generator 18 and the gearbox 22. Coolant mixed with a substantial amount of air is considered $C_m$ in this example. Coolant $C_m$ moving from the generator 18 and the gearbox 22 is thus unsuitable for direct recirculation back to the gearbox 22 and the generator 18. Accordingly, the coolant $C_m$ is communicated to a deaerator 34 to remove the air. Deaerated coolant $C_d$ from the deaerator 34 is the collected within a sump 38. The deaerated coolant $C_d$ is communicated from the sump 38 through a chiller 42 back to the gearbox 22 and the generator 18.

Although the pump 26, the deaerator 34, the sump 38, and the chiller 42 are schematically shown as separate from the gearbox 22, some or all of these components may be disposed within the gearbox 22.

Figure 2:
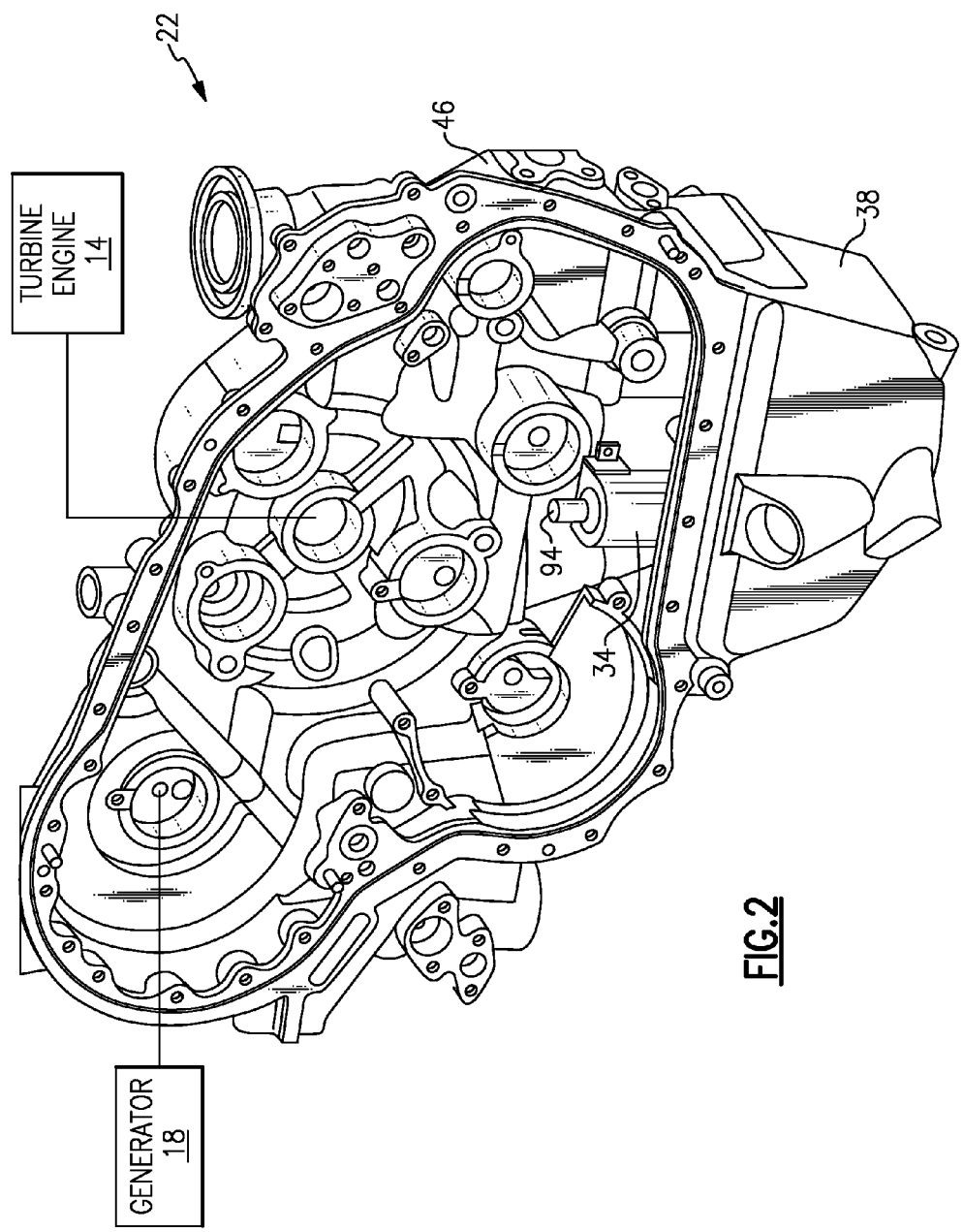
FIG. 2 shows a partial cutaway view of a portion of a gearbox within the FIG. 1 auxiliary power unit.
Figure 4:
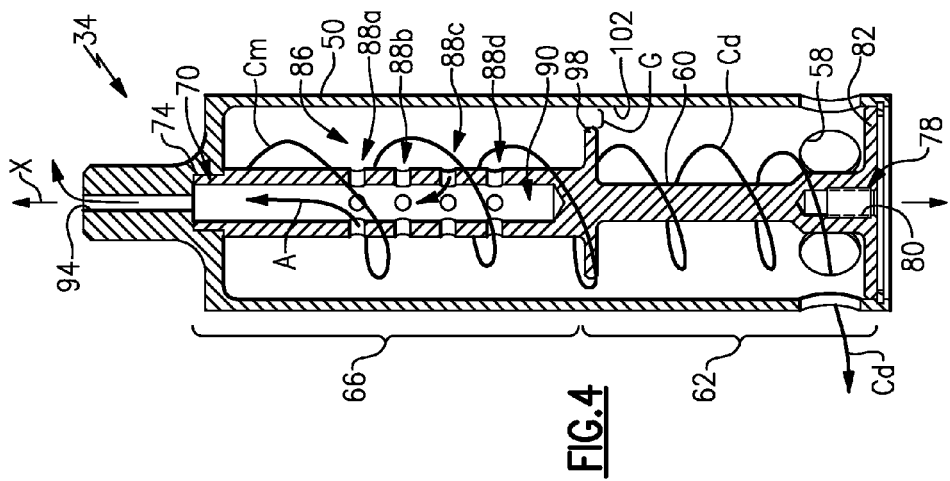
FIG. 4 shows a section view at line 4-4 of FIG. 3.
Figure 3:
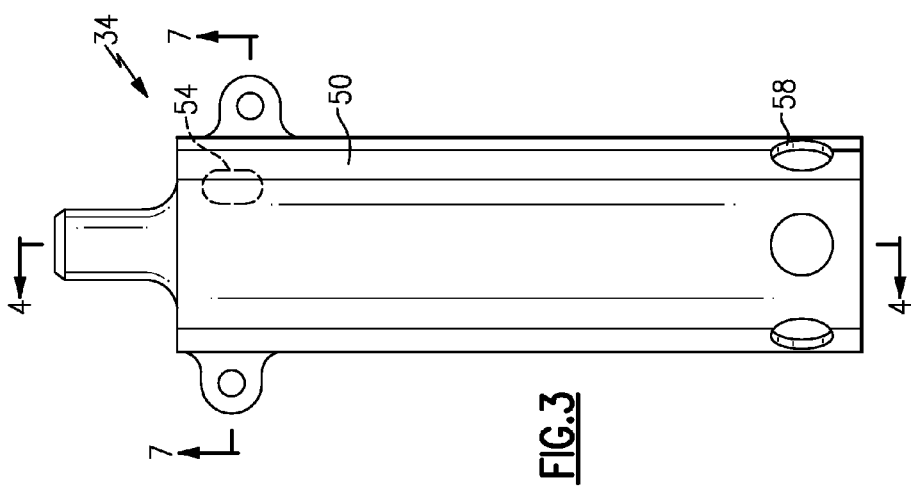
FIG. 3 shows a side view of an example deaerator used in the FIG. 1 auxiliary power unit.
Figure 6:
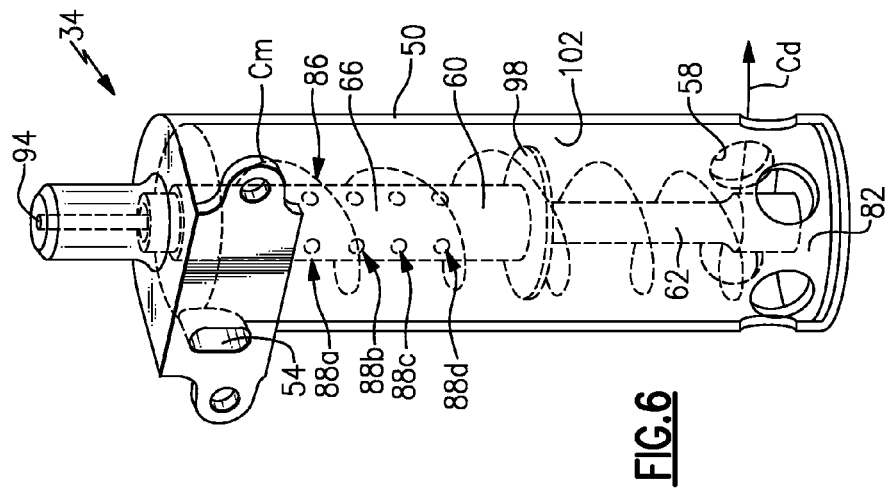
FIG. 6 shows a partial cutaway view of the FIG. 3 deaerator.
Figure 5:
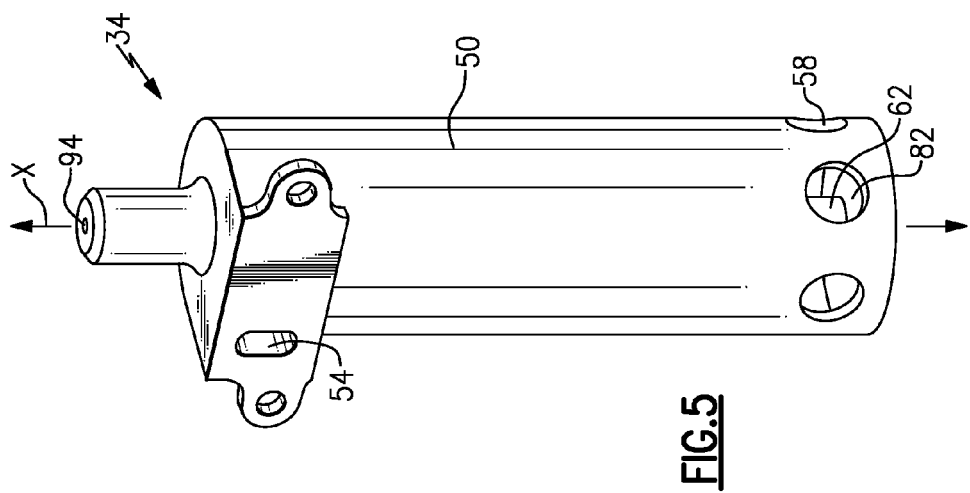
FIG. 5 shows a perspective view of the FIG. 3 deaerator.

Referring now to FIG. 2, the gearbox 22 rotatably links the turbine engine 14 to the generator 18 through an arrangement of gears. The gears are not shown in this example for clarity reasons. However, a person having skill in this art would understand how to rotatably link the turbine engine 14 to the generator 18 using an arrangement of gears within the gearbox 22. In this example, the sump 38 is secured to a gearbox housing 46, and the deaerator 34 is disposed within the sump 38.

Referring to FIGS. 3-7 with continuing reference to FIG. 2, the example deaerator 34 includes a deaerator housing 50 that is generally cylindrical and extends along an axis X. The deaerator housing 50 establishes an inlet 54 and a plurality of outlets 58. The inlet 54 communicates the coolant $C_m$ into the deaerator 34. The outlets 58 communicate the deaerated coolant $C_d$ from the deaerator 34. The outlets 58 are positioned vertically below the inlet 54 in this example. The deaerator 34 is aluminum in this example.

The deaerator 34 includes a deaerating member 60 having a pedestal section 62 connected to a stem section 66. The deaerating member 60 is disposed within an interior of the deaerator housing 50 and aligned coaxially with the axis X.

An end portion 70 of the stem section 66 is received within a recess 74 established by the deaerator housing 50. An end portion 78 of the pedestal section 62 is secured to the deaerator housing 50 with a threaded attachment 80. The pedestal section 62 also includes a flange 82 at the end portion 78 received within the interior of the deaerator housing 50. The flange 82, the threaded attachment 80, and the end portion 70 received within the recess 74 maintain the position of the deaerating member 60 relative to the deaerator housing 50.

The example stem section 66 includes an array of apertures 86. Each of the apertures 86 extends radially relative to the axis X. The example array includes four groups 88a-88d of apertures 86. Each of the groups 88a-88d includes four individual apertures 86 that are circumferentially distributed about the axis X. The apertures 86 within each one of the groups 88a-88d are axially aligned. Each of the groups 88a-88d is axially spaced from the other groups 88a-88d. Other example stem sections may include other arrangements of apertures.

The inlet 54 of the deaerator 34 has a generally oval and noncircular shape in this example. Notably, the inlet 54 is established within the deaerator housing 50 such that the inlet 54 communicates the coolant $C_m$ into the deaerator housing 50 in a manner that encourages a spiraling movement of the coolant $C_m$ about the axis X. That is, the coolant $C_m$ is not communicated through the inlet 54 directly toward the axis X.

After the coolant $C_m$ moves through the inlet 54 into the interior of the deaerator housing 50, the mixture spirals around the stem section 66 toward the pedestal section 62. As the coolant $C_m$ spirals, centrifugal force tends to move the coolant within the coolant $C_m$ away from the axis C and air A within the coolant $C_m$ toward the axis X. At least some of the air A moves toward the axis X and through the apertures 86 into a bore 90 established within the stem section 66. The air A communicates through the bore 90 and moves through a vent 94 to the surrounding environment. Accordingly, the coolant $C_m$ includes less of the air A as the coolant $C_m$ spirals vertically downward toward the pedestal section 62.

After moving vertically past the stem section 66, the coolant $C_m$ is forced through a gap G established between a shelf portion 98 of the pedestal section 62 and an inner wall 102 of the deaerator housing 50. Moving the coolant $C_m$ through the gap G separates some of the remaining air A from the coolant $C_m$. The air A separated because of the gap G may move vertically upward and move through the apertures 86 where the separated air A is communicated to the surrounding environment through the vent 94. After moving through the gap G, the coolant $C_m$, which now includes considerably less of the air A than when the coolant $C_m$ was moved into the deaerator 34, is considered deaerated coolant $C_d$ and suitable for recirculation through the gearbox 22 and the generator 18. That is, the deaerator 34 may not remove all of the air A from the coolant $C_m$ that enters the deaerator 34, but removes enough of the air A from the coolant $C_m$ so that the coolant is suitable for recirculation as deaerated coolant $C_d$. A person having skill in this art and the benefit of this disclosure would understand how much of the air A must be removed from the coolant $C_m$ before the coolant $C_m$ can be considered deaerated coolant $C_d$ that is suitable for recirculation.

The level of deaerated coolant $C_d$ within the sump 38 is typically kept at a level that is vertically above the outlets 58. In one specific example, the level of deaerated coolant $C_d$ within the sump 38 is maintained at a vertical position coinciding approximately with the vertical position of the group of apertures 88b.

Features of the disclosed examples include a deaerator utilizing centrifugal force to separate air from coolant. The disclosed examples more effectively and more quickly separate air from coolant. In one specific example, the disclosed example separates an acceptable level of air from a coolant five to six seconds faster than a prior art deaerator.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A deaerator assembly, comprising:
    a housing; and
    a deaerating member disposed with the housing, the deaerating member including an apertured stem extending from a pedestal, wherein the apertured stem is configured to communicate air away from a mixture of air and coolant when the mixture of air and coolant is communicated about the apertured stem.

2. The deaerator assembly of claim 1, wherein the housing is cylindrical and extends along an axis, the deaerating member being arranged coaxial with the housing.

3. The deaerator assembly of claim 1, wherein a plurality of apertures of the apertured stem are configured to communicate air from the mixture of air and coolant to a bore established within the apertured stem, the bore configured to communicate the air to a vent.

4. The deaerator assembly of claim 1, wherein the apertured stem extends from a shelf portion of the pedestal.

5. The deaerator assembly of claim 4, wherein the shelf portion extends radially closer to an interior wall of the housing than the other portions of the pedestal or the stem.

6. The deaerator assembly of claim 1, wherein the housing establishes an inlet configured to direct the mixture of air and coolant into the housing such that the mixture of air and oil is spiraled about the apertured stem.

7. The deaerator assembly of claim 1, wherein the deaerating member extends from a first axial end of the housing to a second axial end of the housing opposite the first end.

8. The deaerator assembly of claim 1, wherein the apertured stem defines a plurality of groups of apertures that are axially spaced along the apertured stem.

9. An aircraft auxiliary power unit assembly, comprising:
    a gearbox configured to rotatably couple a turbomachine to a generator;
    a coolant path configured to communicate a coolant through the gearbox and the generator; and
    a deaerator assembly having a deaerating member that includes an apertured stem extending from a pedestal, wherein a mixture of air and the coolant is communicated about the apertured stem to separate air from the coolant.

10. The aircraft auxiliary power unit assembly of claim 9, wherein the deaerator assembly includes at least one outlet configured to communicate the coolant to a sump.

11. The aircraft auxiliary power unit assembly of claim 10, wherein the deaerator assembly is positioned within the sump.

12. The aircraft auxiliary power unit assembly of claim 9, wherein the deaerator member extends from a first axial end of the deaerator assembly to an opposing, second axial end of the deaerator assembly.

13. The aircraft auxiliary power unit assembly of claim 9, wherein the deaerator assembly includes an inlet configured to spiral the mixture of air and the coolant about the apertured stem.

14. A method of removing air from a mixture of air and coolant, comprising:
    spiraling a mixture of air and coolant about an apertured stem in a deaerator assembly;
    communicating at least some of the air from the mixture through an array of apertures in the apertured stem to a bore in the apertured stem;
    venting the air from the bore; and moving at least some of the mixture of air and coolant through a circumferential gap in the deaerator assembly, the gap established between an interior wall of a housing of the deaerator assembly and a pedestal portion of the deaerator assembly.

15. The method of claim 14, wherein the apertured stem extends axially from the pedestal portion.

16. The method of claim 14, including communicating coolant from the deaerator assembly to a sump after the communicating at least some of the air from the mixture.

* * * * *